Jan. 14, 1964   J. RIJNDERS   3,118,065
ARTIFICIAL SUN RADIATOR WITH LIMITED ULTRAVIOLET
Filed Oct. 29, 1959   2 Sheets-Sheet 1

INVENTOR
J. RIJNDERS
BY
AGENT

Jan. 14, 1964 J. RIJNDERS 3,118,065
ARTIFICIAL SUN RADIATOR WITH LIMITED ULTRAVIOLET
Filed Oct. 29, 1959 2 Sheets-Sheet 2

INVENTOR
J. RIJNDERS
BY
AGENT 3,118,065
ARTIFICIAL SUN RADIATOR WITH LIMITED ULTRAVIOLET
Johannes Rijnders, Eindhoven, Netherlands, assignor to North American Philips Company Inc., New York, N.Y., a corporation of Delaware
Filed Oct. 29, 1959, Ser. No. 849,511
Claims priority, application Netherlands Nov. 19, 1958
7 Claims. (Cl. 250—88)

There is known a radiation apparatus comprising a first radiation source having a spectrum containing little or no ultraviolet radiation, a first reflector being arranged behind this radiation source. This known apparatus comprises furthermore a second radiation source having a spectrum which is comparatively rich in ultraviolet radiation, while this known apparatus has a second reflector arranged behind this second source of radiation. Such apparatus, which are employed as artificial suns, are equipped with an infrared radiation source to produce, by the heat irradiated by the infrared radiation source, a certain feeling of pleasantness with the user. This known apparatus, however, has the disadvantage which is practically inherent in artificial suns, that the radiated ultraviolet light is, as a rule, not restricted to the surface or the object to be irradiated. Owing to the possible detrimental effect of the ultraviolet light, the persons present have to take precautions. The present invention has for its object to obviate this disadvantage.

The radiation apparatus according to the invention is characterized in that, whereas the first reflector (which cooperates with the first radiation source having a spectrum containing little or no ultraviolet radiation) is arranged both in front of the second radiation source (which emits a spectrum which is comparatively rich in ultraviolet radiation) and in front of the second reflector, the latter reflector is constructed so that in the radiation concentrated by it and emanating from the second radiation source one or more concentrations occur, which are located in the immediate proximity or at the place of one or more openings in or near the first reflector.

It is thus ensured that substantially only a concentrated radiation from the second radiation source projects from the apparatus, so that by suitable choice of the shape of the second reflector, of the position of the second radiation source with respect to the second reflector and of the shape and the position of the openings in the first reflector with respect to the second reflector, the field produced by the radiation from the second radiation source can be very accurately defined. This is an important advantage of the radiation apparatus according to the invention. The said openings may be provided in the body of the first reflector, but they may also be limited by edges which belong wholly or partly to further parts of the radiation apparatus. It is possible, for example, to cause the radiation from the second radiation source to emanate to the outside beyond the first reflector.

If reference is made to openings, they are to be understood to mean not only recesses but also windows, closed or not closed, in or near the first reflector, through which windows the whole radiation or part thereof, emanating from the second radiation source, can leave the apparatus.

In order to prevent the radiation from the second radiation source from striking the first radiation source, the radiation source co-operating with the first reflector in an advantageous embodiment of the apparatus according to the invention is located mainly in a meridian plane of this reflector, while the openings in this reflector are provided at a certain distance from the axis thereof in the reflector body. It is thus ensured that, when looking into the radiation apparatus, not only the radiation source co-operating with the first reflector, but also at the side of this radiation source, in the openings of the reflector light concentrations are observed, which operate as apparent light souces with a spectrum emanating from the radiation source co-operating with the second reflector.

In a further embodiment of the apparatus according to the invention the radiation source co-operating with the second reflector is located at least substantially in a meridian plane of the first reflector, while the second reflector has a knee at the area of this meridian plane and extending in this plane.

With a further embodiment of the apparatus according to the invention the sectional area of the second reflector passing through the central part of the second radiation source, taken at right angles to the knee between the halves of the second reflector, is formed mainly by two ellipsoid curves, of which one of the foci coincides at least approximately with the part of the radiation source lying in the said sectional area and co-operating with the second reflector, whereas the other focus of each of the curves is located at least approximately at the area of that part of one of of the openings in the first reflector which is located in the sectional area concerned.

According to a further embodiment of the apparatus according to the invention the first radiation source is substantially linear and extends parallel to the second radiation source.

A further embodiment of the apparatus according to the invention is such that the openings in the first reflector are provided with filters which may be removable.

The invention will now be described more fully with reference to the drawing.

Figure 1:
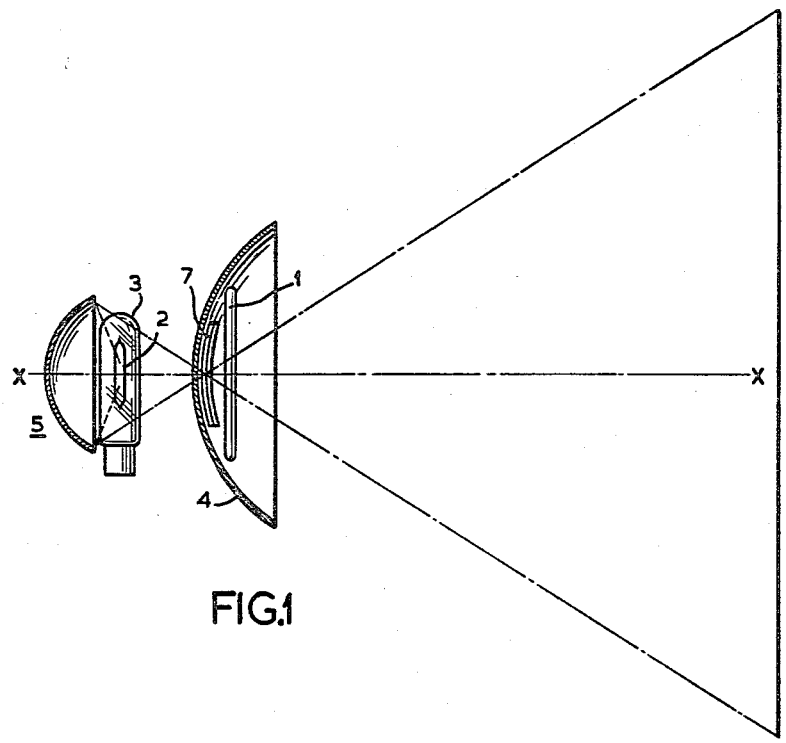
FIGURES 1 and 2 are a vertical and a horizontal sectional view respectively of the optical system with the radiation sources of one embodiment of the radiation apparatus according to the invention.
Figure 2:
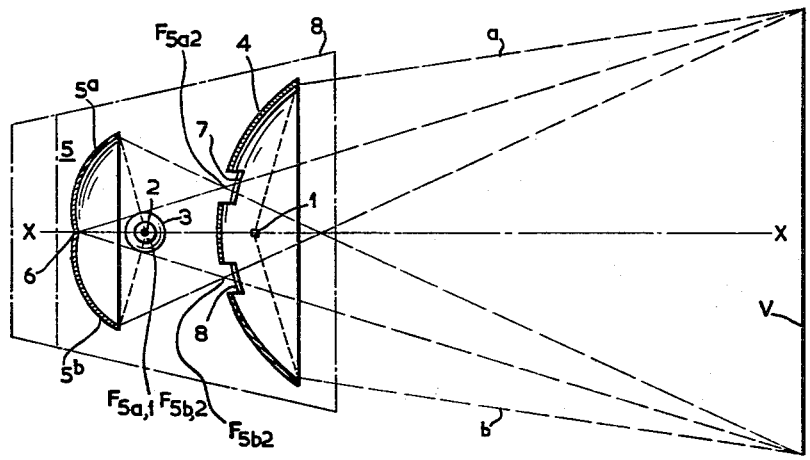
Figure 3:
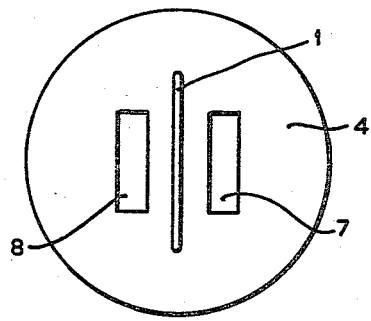
FIGURE 3 is a diagrammatical front view of the reflector which co-operates with the first radiation source.

As is evident from FIGURES 1 and 2, the apparatus comprises two radiation sources, which are arranged one behind the other in the direction of radiation X—X. The first radiation source, which is designated by 1, consists of a rod-shaped element which emits a radiation, when switched on, which radiation has a comparatively poor ultraviolet emission, but has, on the contrary, a high content of red and infrared radiation. At a certain distance therefrom is arranged the radiation source 2, which emits a spectrum which is comparatively rich in ultraviolet radiation and hence has the known effect of an artificial sun. This radiation source, which may be formed by a high-pressure mercury-vapour discharge lamp, is housed in a glass bulb 3.

Figure 4:
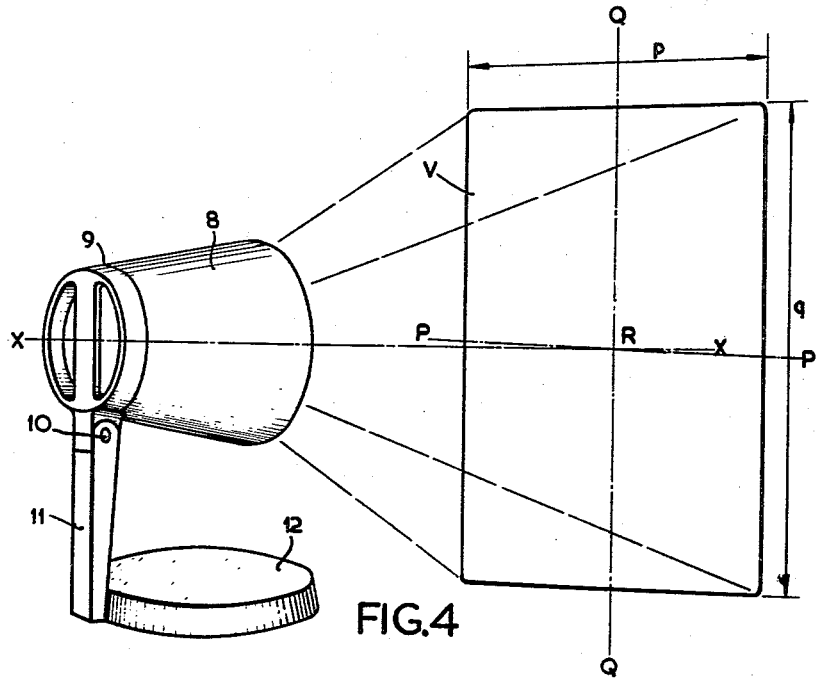
FIGURE 4 is a perspective view of the radiation apparatus with the surface irradiated thereby, in which case the apparatus is orientated so that the main direction of the emanating radiation is substantially horizontal.

Behind the first radiation source 1 is arranged a substantially spherical mirror 4 at a distance such that the light from the radiation source 1, collected by this mirror, is united in a divergent beam, of which the outer boundaries are designated by $a$ and $b$ in FIGURE 2. In this embodiment of the invention the mirror 4 is proportioned and arranged relatively to the radiation source 1 so that at the area of the surface V, where the object to be irradiated is located, the sectional area of the beam from the mirror 4 has a surface of about 40 x 60 cms., as is indicated in FIGURE 4 by the dimensions $p$ and $q$. Owing to the elongated shape of the radiation source 1 the dimension $q$ is slightly greater than the dimension $p$.

The radiation source 2 is arranged behind the first reflector 4 and in front of the second reflector 5. This second reflector consists mainly of two ellipsoidal parts 5a and 5b, which are separated from one another by a knee, 6, which is provided in this mirror and extends approximately in the plane of the drawing of FIGURE 1. The two ellipsoidal mirror parts 5a and 5b have, in a horizontal sectional area, one focus at least approximately in the neighbourhood of the discharge path of the radiation source 2 and the other focus in or in the immediate proximity of the line of intersection of this horizontal plane with the surface of the first reflector 4. This is evident from the situation shown in FIGURE 2. Of the sectional areas of the mirror parts 5a and 5b the first foci $F_{5a,1}$ and $F_{5b,1}$ are located at the place of the discharge path of the discharge lamp 2 and the other foci $F_{5a,2}$ and $F_{5b,2}$ at least approximately in the plane of the reflector 4. In this plane elongated recesses 7 and 8 are provided, so that through these openings the radiation from the mirror parts 5a and 5b can pass unhindered. The mirror parts 5a and 5b are proportioned and arranged with respect to the discharge path 2 so that substantially all light concentrated by the mirror parts 5a and 5b emanates to the outside through these openings in the reflector 4. The mirror parts 5a and 5b are furthermore located relatively to each other so that the beams from both the mirror parts have a sectional area on the surface V which corresponds approximately to the dimensions p and q of FIGURE 4. This has the result that an object at the area of the surface V is irradiated uniformly both by the radiation source 1 and by the radiation source 2. Outside this surface there are substantially no rays emanating from the radiation source 2, so that this radiation apparatus is not harmful for bystanders.

As is in particular evident from FIGURE 4, the two radiation sources and the associated reflectors are housed in a funnel shaped housing 8, which is shown in FIGURE 2 in broken lines. This housing is connected with a leg 11 via a terminal piece 9 and a pivot 10, this leg forming part of a base 12. By turning the housing 8 about the pivot 10, the opening of the housing 8 arrives on the top side of the base 12, the position of the apparatus then obtained being suitable for the inoperative state of the apparatus, since it then takes little space. Provisions may be made to render the housing 8 rotatable about the axis X—X relative to the terminal piece 9. It can thus be ensured that in the position shown in FIGURE 4 of the radiation apparatus the longitudinal axis Q—Q and the axis of width P—P of the luminous spot V can be rotated at will about the centre R of this spot.

It will be obvious that by suitable choice of the dimensions of the radiation sources, of the reflectors and of the openings in the reflector 4, substantially any desired dimension of the light spot V at any desired distance from the radiation apparatus can be obtained.

With the embodiment shown the mirror 5 is kinked in order to direct the light from the radiation source 2 alongside the radiation source 7. However, it is possible to choose the form of a circle for the radiation source 1, while the reflector 4 is provided, for example, with a single central opening.

Provisions may be made to switch on or off the radiation sources 1 and 2 independently of each other. The switching elements and preliminary switching elements required to this end may, if desired be accommodated in the base 12.

The openings 7 and 8 in the reflector 4 are suitable for co-operation with colour selection filters, which may be put in or out of operation. The filters may be displaceable behind these openings, so that they can be moved at will into or out of the course of the radiations.

What is claimed is:

1. A radiation source comprising a first source of substantially ultraviolet free radiation, a first reflector having a given axis for said source, said first reflector being provided with an aperture therein, a second source of radiation comparatively rich in ultraviolet rays, a second reflector for said second source, said second source and said second reflector being positioned coaxially directly behind said first reflector, said second reflector having a focus approximately at said aperture in said first reflector whereby radiation from said second source is transmitted only through the aperture in said first reflector.

2. A radiation source comprising a first source of substantially ultraviolet free radiation, a first reflector for said source, said first source being located substantially in a meridian plane of said first reflector, said first reflector having a given axis and being provided with a non-axial aperture therein, a second source of radiation comparatively rich in ultraviolet rays, a second reflector for said second source, said second source and said second reflector being positioned coaxially directly behind said first reflector, said second reflector having a focus approximately at said aperture in said first reflector whereby radiation from said second source is transmitted only through the aperture in said first reflector.

3. A radiation source comprising a first source of substantially ultraviolet free radiation, a first reflector for said source, said first source being located substantially in a meridian plane of said first reflector, said first reflector having a given axis and being provided with a non-axial aperture therein, a second source of radiation comparatively rich in ultraviolet rays located substantially in said meridian plane of said first reflector, a second reflector for said second source, said second source and said second reflector being positioned coaxially directly behind said first reflector, said second reflector having a focus approximately at said aperture in said first reflector whereby radiation from said second source is transmitted only through the aperture in said first reflector.

4. A radiation source comprising a first source of substantially ultraviolet free radiation, a first reflector for said source, said first source being located substantially in a meridian plane of said first reflector, said first reflector having a given axis and being provided with a non-axial aperture therein, a second source of radiation comparatively rich in ultraviolet rays located substantially in said meridian plane, a second reflector for said second source through which said meridian plane passes and having a kink therein lying substantially in said meridian plane, said second source and said second reflector being positioned coaxially directly behind said first reflector, said second reflector having a focus approximately at said aperture in said first reflector whereby radiation from said second source is transmitted only through the aperture in said first reflector.

5. A radiation source comprising a first source of substantially ultraviolet free radiation, a first reflector for said source, said first source being located substantially in a meridian plane of said first reflector, said first reflector having a given axis and being provided with a non-axial aperture therein, a second source of radiation comparatively rich in ultraviolet rays located substantially in said meridian plane, a second reflector for said second source through which said meridian plane passes and having a kink therein lying substantially in said meridian plane, said second source and said second reflector being positioned coaxially directly behind said first reflector, said second reflector having two ellipsoidal curved surfaces substantially at right angles to and on opposite sides of said meridian plane which are joined by said kink, said ellipsoidal surfaces having at least one focus at said second source and another focus in the proximity of said aperture in said first reflector whereby radiation from said second source is transmitted only through the aperture in said first reflector.

6. A radiation source comprising a first linear source of substantially ultraviolet free radiation, a first reflector for said source, said first source being located substantially in a meridian plane of said first reflector, said first reflector having a given axis and being provided with a non-axial aperture therein, a second source of radiation parallel to said first source comparatively rich in ultraviolet rays located substantially in said meridian plane, a second reflector for said second source through which said meridian plane passes and having a kink therein lying substantially in said meridian plane, said second source and said second reflector being positioned coaxially directly behind said first reflector, said second reflector having two ellipsoidal curved surfaces substantially at right angles to and on opposite sides of said meridian plane which are joined by said kink, said ellipsoidal surfaces having at least one focus at said second source and another focus in the proximity of said aperture in said first reflector whereby radiation from said second source is transmitted only through the aperture in said first reflector.

7. A radiation source comprising a first source of substantially ultraviolet free radiation, a first reflector having a given axis for said source, said first reflector being provided with an aperture therein, a second source of radiation comparatively rich in ultraviolet rays, a second reflector for said second source, said second source and said second reflector being positioned coaxially directly behind said first reflector, said second reflector having a focus approximately at said aperture in said first reflector whereby radiation from said second source is transmitted only through the aperture in said first reflector, and a removable filter in the aperture of said first reflector.

References Cited in the file of this patent

UNITED STATES PATENTS

| 2,215,634 | Collins | Sept. 24, 1940 |
| 2,339,010 | Greenwald | Jan. 11, 1944 |
| 2,356,592 | Kolbert | Aug. 22, 1944 |
| 2,482,815 | Urback | Sept. 27, 1949 |

FOREIGN PATENTS

| 197,335 | Great Britain | Published, 1924 |
| 291,606 | Great Britain | June 7, 1928 |
| 359,359 | Great Britain | Oct. 22, 1931 |